Figure 1:
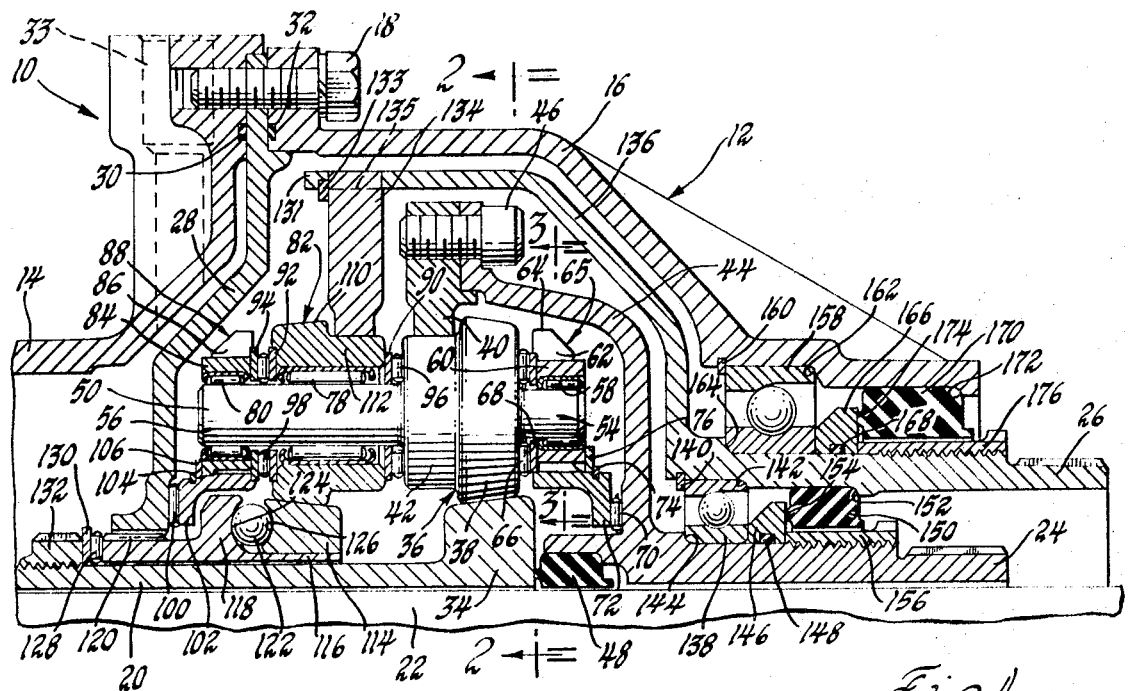

United States Patent
Scheiter

[15] 3,667,319
[45] June 6, 1972

[54] ROLLER TRACTION DRIVE MECHANISM

[72] Inventor: Milton H. Scheiter, Bloomfield Hills, Mich.

[73] Assignee: General Motors Corporation, Detroit, Mich.

[22] Filed: July 20, 1970

[21] Appl. No.: 56,315

[52] U.S. Cl. .......................................... 74/665 K, 74/798
[51] Int. Cl. ............................... F16n 37/06, F16n 13/08
[58] Field of Search............... 74/665 F, 665 H, 665 S, 665 K, 74/798, 801

[56] References Cited

UNITED STATES PATENTS

| | | | |
|---|---|---|---|
| 2,480,806 | 8/1949 | Desmoulins | 74/801 X |
| 3,088,414 | 5/1963 | Ozgur | 74/665 S |
| 2,700,311 | 1/1955 | Bade | 74/801 X |
| 3,475,993 | 11/1969 | Hewko | 74/665 K X |
| 3,304,804 | 2/1967 | Oldfield et al. | 74/665 X |
| 2,042,691 | 6/1936 | Williams | 74/801 X |

FOREIGN PATENTS OR APPLICATIONS

| | | | |
|---|---|---|---|
| 349,137 | 5/1931 | Great Britain | 74/798 |

*Primary Examiner*—Carlton R. Croyle
*Assistant Examiner*—Thomas C. Perry
*Attorney*—Warren E. Finken, A. M. Heiter and John P. Moran

[57] ABSTRACT

A contrarotating, equal speed-change ratio, dual output compound roller traction driver mechanism from a single input, wherein the single input drives one member of split input sun members. The driven sun members rotates a first set of split planet pinions, the latter, in turn, driving both a carrier member and a first ring member connected to a first output shaft. The driven carrier member rotates the second set of split planet pinions on the other or fixed member of the split input sun members in the opposite direction to that of the first set of planet pinions. The second set of planet pinions, in turn, drives a second ring member connected to a second output shaft for driving the latter at the same speed and torque as the first output shaft and in the opposite direction thereto.

4 Claims, 3 Drawing Figures

PATENTED JUN 6 1972 3,667,319

INVENTOR.
Milton H. Scheiter
BY
John P. Moran
ATTORNEY

ROLLER TRACTION DRIVE MECHANISM

This invention relates to friction drive mechanisms and more particularly to single input, dual output compound planetary-type roller traction drive mechanisms.

In underwater vehicle applications, such as submarines and torpedo drives, as well as some surface applications, it is desirable to have one input and two contrarotating equal speed ratio propeller outputs in order to substantially eliminate the net reaction torque which tends to rotate the vehicle about its longitudinal axis. It is also desirable to have a quiet, vibration-free and efficient operation, wherein the two propellers run at a predetermined varied speed from that of the prime mover.

Accordingly, an object of the invention is to provide an improved single input, dual contrarotating output, compound friction drive mechanism, wherein both outputs are driven at the same decreased speed.

Another object of the invention is to provide an improved compound friction drive mechanism which is compact in design and efficient in operation.

A further object of the invention is to provide a compound friction drive mechanism embodying split sun members, one of which is secured to the single input shaft and the other of which is mounted around the input shaft and fixed against rotation thereon; split sets of planet pinions wherein respective aligned planet pinions of the two sets are mounted on a common shaft, one of the aligned planet pinions being secured thereon and the other being rotatably mounted thereon, the latter also rotating around the fixed sun member; and "floating" carrier means rotatably mounted on the ends of the common shafts for rotation therewith, retaining the planet pinions and their shafts in the desired spaced relationship; and two ring members rotatable by the respective sets of planet pinions for driving the two output shafts in opposite directions at the same decreased speed.

Figure 2:
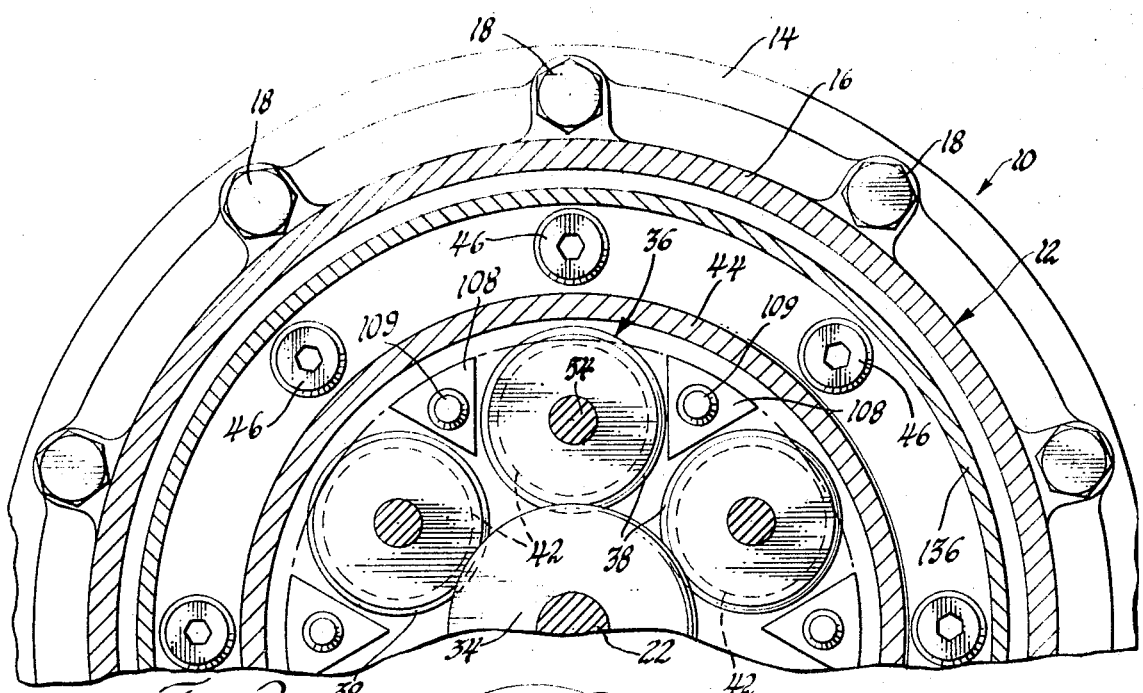
Figure 3:
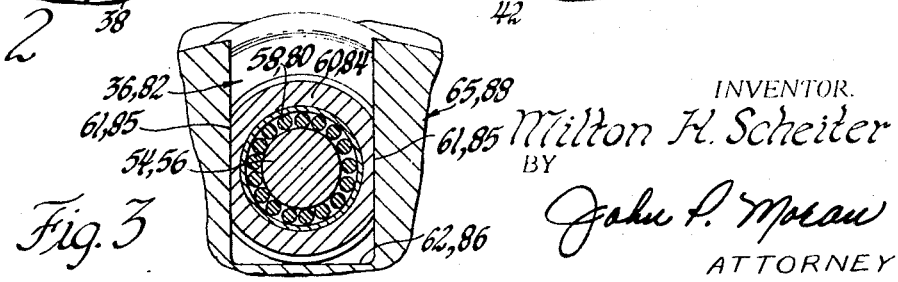

These and other objects and advantages of the invention will become apparent when reference is made to the following description and accompanying drawings, wherein:

FIG. 1 is a fragmentary cross-sectional view of a friction drive mechanism embodying the invention;

FIG. 2 is a fragmentary cross-sectional view taken along the plane of line 2—2 of FIG. 1, as if FIG. 1 were a full round view, and looking in the direction of the arrows; and FIG. 3 is a fragmentary cross-sectional view taken along the plane of line 3—3 of the right-hand planetary portion of FIG. 1, as if FIG. 1 were a full round view, and looking in the direction of the arrows. This figure further includes the reference numerals applicable to the similar left-hand planetary portion.

Referring now to the drawings in greater detail, FIG. 1 illustrates a roller traction drive mechanism 10, including a housing 12 having a front housing portion 14 and a rear housing portion 16 connected together by bolts 18. An input sleeve shaft 20 mounted on a fixed control shaft 22 extends into the front housing portion 14, while two concentric output shafts 24 and 26 extend from the rear housing portion 16. A fixed annular wall member 28 is confined between the front and rear housing portions 14 and 16, there being O-ring seals 30 and 32 adjacent opposing faces thereof in grooves formed in the adjacent inner and outer housing surfaces. An oil inlet port 33 is formed in the front housing portion 14.

A first split sun member 34 is formed as an integral part of the inner end of the input shaft 20. A first set of two-diameter equally spaced split planet pinions 36 are rotatably mounted at their larger diameter portions 38 around the first split sun member 34. A first ring member 40 is rotatably mounted around the smaller diameter portions 42 of the planet pinions 36. A first flange member 44 is formed on the inner end of the inner concentric output shaft 24 and secured by bolts 46 to the ring member 40. A face seal 48 is mounted between the adjacent inner ends of the input and output shafts 20 and 24, respectively.

Planet pinion shafts 50 are secured to and extend from the first set of planet pinions 36, and each shaft 50 includes a short portion 54 extending to the right in FIG. 1 and a long portion 56 extending to the left in FIG. 1. Needle bearings 58 are mounted on each short shaft extension 54 within a sleeve member 60, the latter having oppositely disposed parallel flats 61 (FIG. 3) formed on the outer periphery thereof for being slidably mounted in parallel-sided slots or openings 62 formed in the right end-disc 64 of a carrier member 65.

Bearings 66 are mounted between the right-hand face (FIG. 1) of each planet pinion 36 and a thrust washer 68 mounted around the short shaft extension 54 adjacent the end faces of the sleeve member 60 and the carrier member end-disc 64. A bearing 70 is mounted between the opposing faces of an internal flange 72 formed on the end-disc 64 of the carrier member 65 and the flange member 44. A retainer ring 74 is mounted on the outer periphery of the internal flange 72 adjacent a spacer 76 abutting against the right-hand (FIG. 1) end face of the sleeve member 60.

Needle bearings 78 and 80 are mounted on each long pinion shaft extension 56. A second set of planet pinions 82 is rotatably mounted on the respective needle bearings 78. The bearings 80 are rotatably mounted in a sleeve member 84 similar to sleeve member 60. Oppositely disposed parallel flats 85 (FIG. 3) are formed on the outer periphery of the sleeve member 84 for being slidably mounted in parallel-sided radial slots or openings 86 formed in the left end-disc 88 of the carrier member 65.

It may be noted in FIG. 3 that the slidably mounted flat-sided sleeve members 60 and 84 are free to "float" or move radially relative to the slots 62 and 86, respectively, as required to maintain the respective planet pinions 36 and 82 properly located relative to the adjacent planetary members.

Thrust washers 90 and 92 are mounted on the shaft extension 56 adjacent the end faces of each planet pinion 82, while another thrust washer 94 is mounted adjacent the right face (FIG. 1) of the sleeve member 84 and the left end-disc 88. Bearings 96 are mounted between the thrust washer 90 and the left face of the small diameter portion 42 of each of the first set of planet pinions 36, and bearings 98 are mounted between the thrust washers 92 and 94. A bearing 100 is mounted between an internal flange 102 and a face of the fixed annular wall member 28. A retainer ring 104 is mounted on the outer periphery of the internal flange 102 adjacent a spacer 106 abutting against the left-hand end face of the sleeve member 84.

Hence, the carrier member 65 is, in effect, floating, i.e., restrained radially only by virtue of being mounted on the sleeve members 60 and 84, but is rotatably confined axially between the bearings 70 and 100 adjacent the flange and wall members 44 and 28, respectively, the end-discs 64 and 88 of the carrier 65 being interconnected by ribs 108 (FIG. 2), extending longitudinally therebetween intermediate the aligned rows of planet pinions 36 and 82, the assembly being held together by long rivets or bolts 109 mounted longitudinally through the ribs 108.

Similar to the first set of planet pinions 36, the second set of planet pinions 82 each include a large diameter portion 110 and a small diameter portion 112 oppositely disposed from the respective portions 38 and 42 of the planet pinions 36. The large diameter portion 110 is rotatably mounted on a fixed or grounded sun member 114 piloted on a sleeve 116 extending from an axial loader member 118 mounted around the input shaft 20 and connected to the annular wall member 28 by splines 120. A plurality of balls 122 are mounted between opposing ramp surfaces 124 and 126 formed on the axial loader member 118 and the face of the fixed sun member 114, respectively, to maintain a proper axial loading on all rolling contact surfaces in response to the torque loads on the output shafts 24 and 26 and to prevent subsequent rotation of the now fixed sun member 114. A bearing 128 is mounted between the end face of the axial loader member 118 adjacent a washer 130 which abuts against a threaded member or nut 132 threadedly mounted on the input shaft 20.

A second ring member 134 is rotatably mounted around the smaller diameter 112 of the planet pinions 82. A second flange member 136 is formed on the inner end of the outer concentric output shaft 26 and secured in any suitable manner to the second ring member 134, such as by extensions 131 retained by a retainer ring 133 in slots 135 formed in the ring member 134, the flange member 136 being positioned radially outwardly of the first ring member 40 and the first flange member 44.

A first support bearing 138 is mounted radially between the concentric output shafts 24 and 26 and axially between a retainer ring 140 and a shoulder 142 on the outer shaft 26 and a shoulder 144 and a wedge member 146 on the inner shaft 24. An O-ring seal 148 is mounted around the shaft 24 in a groove formed in the inner surface of the wedge member 146, while a face seal 150 is secured to the shaft 26 adjacent a shoulder 152 formed thereon for sliding contact with a face 154 of the wedge 146. A nut 156 is threadedly mounted on the shaft 24, extending through the face seal 150 to abut against the face 154 of the wedge 146 to retain the latter and the bearing 138 in position relative to the shafts 24 and 26, as well as serving to position the ring member 40.

A second support bearing 158 is mounted radially between the output shaft 26 and the housing member 16, and axially between a retainer ring 160 and a shoulder 162 on the housing member 16 and a shoulder 164 and a wedge member 166 on the outer shaft 26. An O-ring 168 is mounted around the shaft 26 in a groove formed in the inner surface of the wedge member 166, while a face seal 170 is secured to the housing member 16 adjacent a shoulder 172 formed thereon for sliding contact with a face 174 of the wedge 166. A nut 176 is threadedly mounted on the shaft 26, extending through the face seal 170 to abut against the face 174 of the wedge 166 to retain the latter and the bearing 158 in position relative to the output shaft 26 and the housing member 16, as well as serving to position the ring member 134.

OPERATION

Assume now that the input shaft 20 is rotating in a clockwise direction, as viewed from the left of FIG. 1. This causes the integrally-formed first split sun member 34 to rotate in a clockwise direction with the input shaft 20. Such rotation of the sun member 34 rotates each individual planet pinion 36 in a counterclockwise direction, while causing the carrier member 65 and the respective planet pinion shafts 50 to rotate in a clockwise direction about the first sun member 34. The counterclockwise rotation of the individual planet pinions 36 causes the first ring member 40 to rotate in a counterclockwise direction, thus driving the first flange member 44 and its associated output shaft 24 in the same counterclockwise direction.

As previously indicated, the second split sun member 114 is fixed against rotation. Hence, as the planet pinion shafts 50 in the carrier 65 are caused to rotate in a clockwise direction, as indicated above, the individual planet pinions 82 will be caused to rotate in a clockwise direction as they travel around the fixed sun member 114. Such clockwise rotation of the planet pinions 82 causes the second ring member 134 to also rotate in a clockwise direction, carrying with it the second flange member 136 and its associated output shaft 26. Thus it is apparent that the concentric output shafts 24 and 26 are rotated in opposite directions.

We shall now analyze the respective resultant speeds of the concentric output shafts 24 and 26.

Assuming first a fixed ring member 40, the speed of rotation of the carrier, "$N_c$," may be indicated as follows:

$$N_c = \frac{R_{p2}R_s}{R_{p2}R_s + R_{p1}R_r} \cdot N_s$$

Where "$N_s$" is the speed of rotation of the first sun member 34, "$R_s$" is the radius of the sun member 34, "$R_{p1}$" is the radius of the smaller diameter portion 42 of each first planet member 36, "$R_{p2}$" is the average radius of the larger diameter portion 38 of each planet pinion 36, and "$R_r$" is the radius of the first ring member 40.

Substituting actual values, $$N_c = \frac{.59(.93)}{.59(.93) + .68(2.20)} \cdot (1.02 \times 10^4)$$

Solving, $N_c = 2{,}730$ rpm.

Applying the 2,730 rpm to the carrier member 65 and retaining the first ring member 40 fixed, the speed of the second ring member 134, "$N_{r2}$," may be indicated as follows:

$$N_{r2} = \frac{R_{p2}R_s + R_{p1}R_r}{R_{p1}R_r} \cdot N_c$$

Substituting actual values again, $$N_{r2} = 2.73 \times 10^3 \cdot \frac{.59(.93) + .68(2.20)}{.68(2.20)}$$

Solving, $N_r = 3{,}740$ rpm with the first ring member 40 locked.

If ring members 40 and 134 are to have the same torque applied thereto, then the carrier member 65 will rotate at 2,730/2 or 1,365 rpm.

Next, freeing the first ring member 40, and applying the above 1,365 rpm to the carrier member 65, the speed of rotation of the first ring member 40, "$N_{r1}$," is indicated as follows:

$$N_{r1} = \frac{R_{p2}R_s}{R_{p1}R_r} \cdot (N_c - N_s) + N_c$$

Substituting actual values, $$N_{r1} = \frac{.59(.93)}{.68(2.20)} \cdot (1{,}365 - 10{,}200) + 1{,}365$$

Solving, $N_{r1} = -1{,}871$ rpm.

Now, considering the second ring member 134, the speed of rotation thereof, "$N_{r2}$," is indicated as follows:

$$N_{r2} = \frac{R_{p2}R_s + R_{p1}R_r}{R_{p1}R_r} \cdot N_c$$

Substituting actual values, $$N_{r2} = \frac{.59(.93) + .68(2.20)}{.68(2.20)} \times 1{,}365 \text{ r.p.m.}$$

Solving, $N_{r2} = +1{,}865$ rpm.

Hence, for the radii values selected, the respective output speeds are substantially identical and in opposite directions.

It is understood that other radii could be selected for other desired output/input equal speed ratios and that, if the loads on the two output shafts were different in a particular application, different radii for the split suns and planet pinions could be selected to produce suitable respective output speeds.

It should be apparent that the invention provides an improved torque- and speed-equalized, dual output friction drive mechanism embodying a small but efficient compact package, with a minimum number of component parts, especially suitable for torpedo drives.

While but one embodiment of the invention has been shown and described, other modifications thereof are possible.

I claim:

1. A compound friction drive mechanism comprising a housing; a power input shaft rotatably supported in said housing; first and second concentric power output shafts; a compound planetary speed-changing unit including first and second split sun members, a carrier member having oppositely disposed end-discs and spaced interconnecting rib members, first and second sets of split two-diameter planet pinions mounted on common shafts for independent rotation thereon, said common shafts alternately extending between said rib members and being supported at the ends thereof in said end-discs, and first and second ring members; axial loader means operatively connected to said second sun member and including a fixed member; and first and second flange members connected between said respective first and second ring members and said first and second power output shafts; said first split sun member being secured to said power input shaft for rotation therewith, said second split sun member being a fixed reaction member secured to said fixed member of said axial loader means, said first set of planet pinions and said carrier member being rotated by said first sun member, the larger diameter portions of said planet pinions being in contact with said first sun member; said first ring member being rotated by the smaller diameter portions of said first set of planet pinions, said second set of planet pinions being driven at the larger diameter portions thereof by said carrier member and said common shafts around said reaction sun member, and said second ring member being rotated by the smaller diameter portions of said second set of planet pinions and thereby driving said second output shaft at substantially the same speed as that of said first output shaft and in a direction opposite thereto.

2. The friction drive mechanism described in claim 1, and means associated with said common shafts for permitting said common shafts to move radially with respect to the axis of said power input shaft.

3. A compound friction drive mechanism comprising a housing; a power input shaft rotatably supported in said housing; first and second concentric power output shafts; first bearing means mounted on an inner wall of said housing; a compound planetary speed-changing unit including first and second spaced sun members, a carrier member mounted at one end thereof against said first bearing means and having oppositely disposed end-discs and spaced rib members extending between said oppositely disposed end-discs, a plurality of oppositely disposed pairs of spaced radial slots formed in the outer peripheries of said end-discs, a sleeve member mounted in each of said slots, a pinion shaft rotatably mounted in each of said oppositely disposed pairs of radial slots intermediate adjacent rib members, first and second sets of spaced planet pinions mounted on each of said pinion shafts for independent rotation thereon, second bearing means intermediate said first and second sets of planet pinions, third bearing means intermediate the outer faces of said first and second planet pinion sets and the adjacent faces of said sleeve members, and first and second spaced ring members, said first sun member being secured to said power input shaft for rotation therewith, said second sun member being a fixed reaction member, said first set of planet pinions and said carrier member being rotated by said first sun member, said first ring member being rotated by said first set of planet pinions, said second set of planet pinions being driven by said carrier member and said pinion shafts around said reaction sun member, and said second ring member being rotated by said second set of planet pinions; first and second flange members connected between said respective first and second ring members and said first and second power output shafts to thereby drive said second output shaft at substantially the same speed as that of said first output shaft and in a direction opposite there; and fourth bearing means intermediate the other end of said carrier member and the adjacent flange member of said first and second flange members.

4. A compound friction drive mechanism comprising a housing; a power input shaft rotatably supported in said housing; first and second concentric power output shafts; a compound planetary speed-changing unit including first and second split sun members, a carrier member independent of said input and output shafts and having oppositely disposed end-discs and spaced interconnecting rib members, first and second sets of split two-diameter planet pinions mounted on common shafts for independent rotation thereon, said shafts alternately extending between said rib members and being supported at the ends thereof in said end-discs, and first and second ring members; and first and second flange members connected between said respective first and second ring members and said first and second power output shafts; said first split sun member being secured to said power input shaft for rotation therewith, said second split sun member being a fixed reaction member, said first set of planet pinions and said carrier member being rotated by said first sun member, the larger diameter portions of said planet pinions being in contact with said first sun member; said first ring member being rotated by the smaller diameter portions of said first set of planet pinions, said second set of planet pinions being driven at the larger diameter portions thereof by said carrier member and said common shafts around said reaction sun member, and said second ring member being rotated by the smaller diameter portions of said second set of planet pinions and thereby driving said second output shaft at substantially the same speed as that of said first output shaft and in a direction opposite thereto, and equally spaced radial slots formed in the outer peripheries of said end-discs of said carrier member, flat-sided sleeve members rotatably mounted on the end portions of said common shafts in said radial slots for permitting said common shafts and said sleeve members to move radially with respect to the axis of said power input shaft.

* * * * *